May 12, 1970 J. W. LEE 3,511,241
INCONTINENCE DEVICE FOR THE MALE PATIENT
Filed June 23, 1966 3 Sheets-Sheet 1
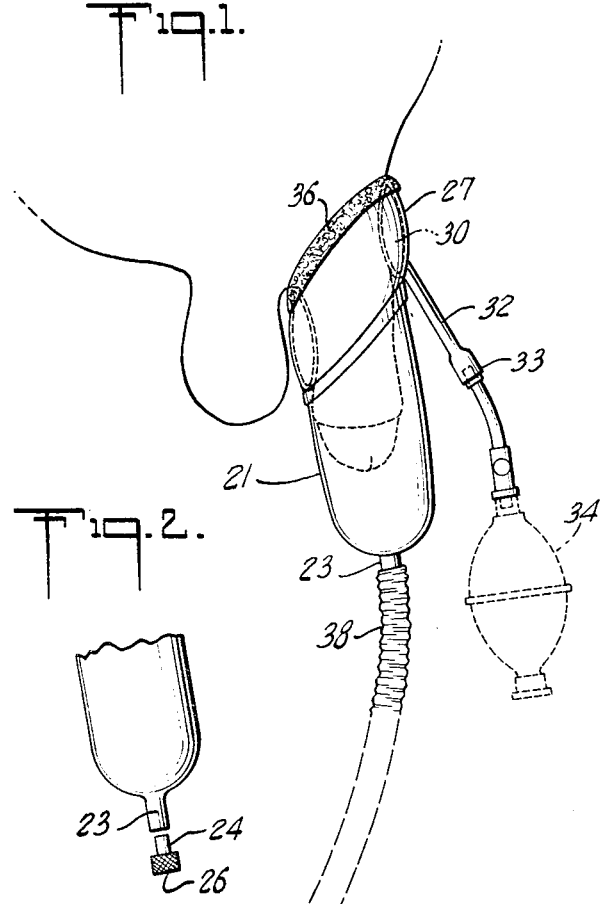
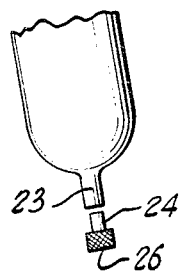
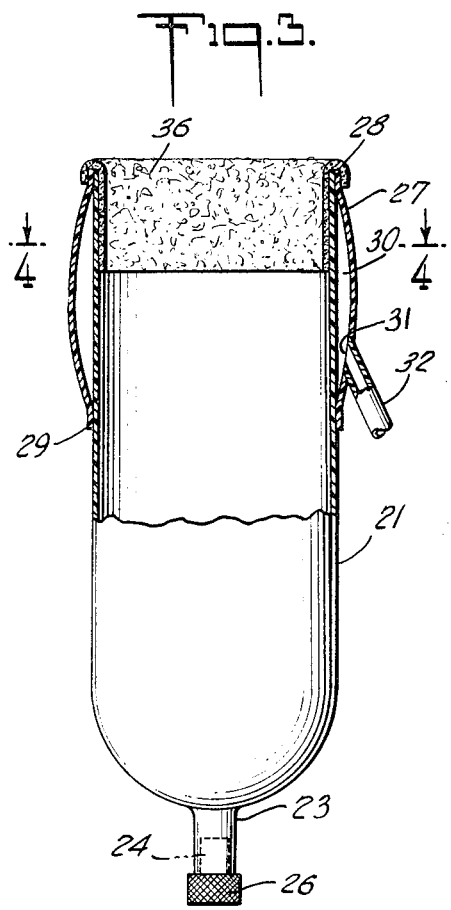
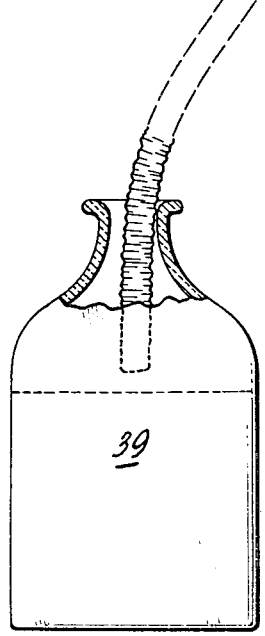
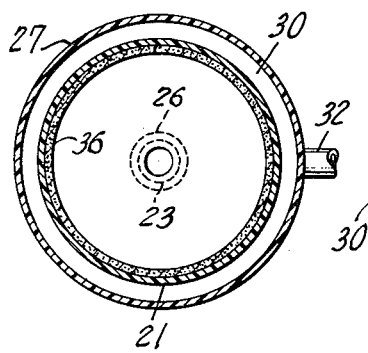
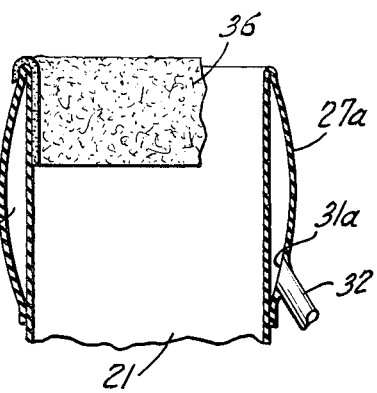
INVENTOR.
JOHN W. LEE
BY
*J. Jordan Kunik*
ATTORNEY

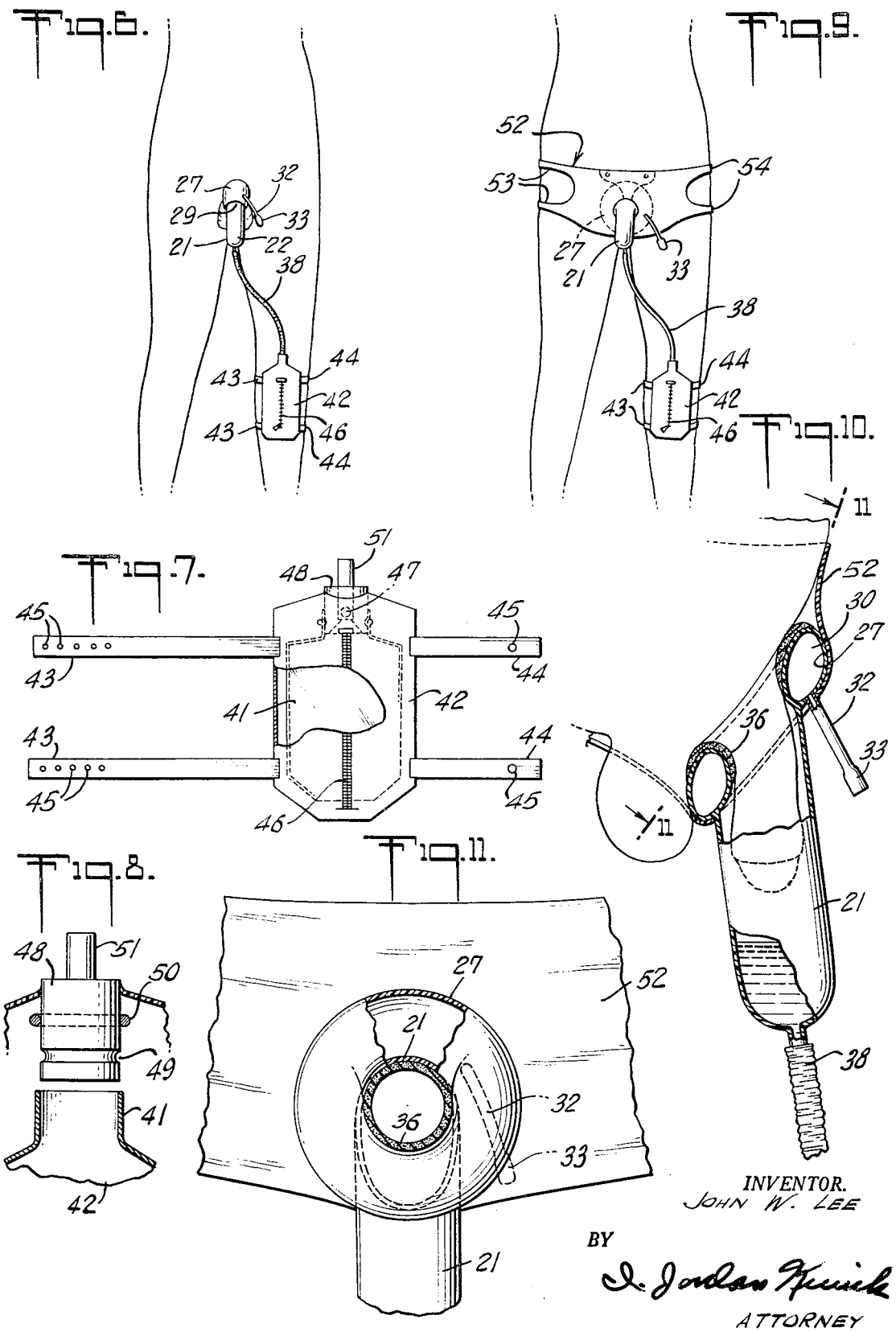

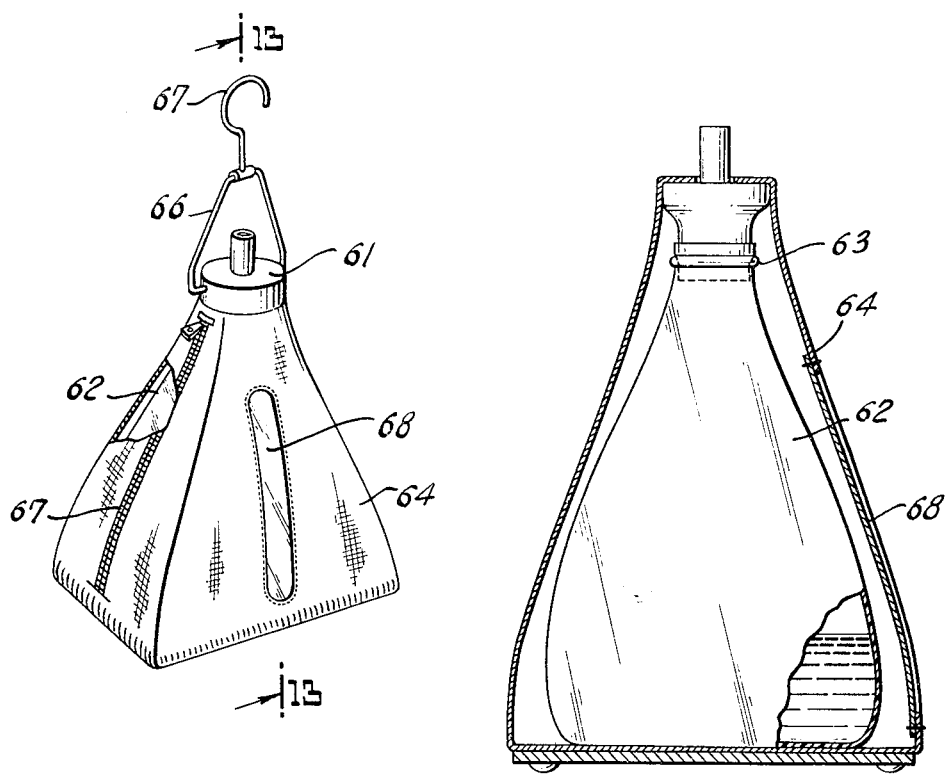

United States Patent Office 3,511,241
Patented May 12, 1970

3,511,241
INCONTINENCE DEVICE FOR THE MALE
PATIENT
John W. Lee, State Veterans Hospital,
Rocky Hill, Conn. 06067
Filed June 23, 1966, Ser. No. 559,768
Int. Cl. A61f 5/44
U.S. Cl. 128—295                    3 Claims

ABSTRACT OF THE DISCLOSURE

A male incontinence device comprising a sheath with an inflatable cuff adjacent the pubic area and arrayed at an angle relative to the axis of said sheath to permit the latter to remain in a dependent position when said cuff is inflated. There is also provided novel drainage means for the sheath comprising a tube having transverse corrugations to provide suitable compliance thereof for draining voided urine into a receptable.

---

This invention relates to incontinence devices and, more particularly, to an inflatable sheath of improved structure for enclosing the male member of the patient and which has improved accessory apparatus to serve both the immobile and ambulatory patient.

Although various internal and external devices are presently available for use by an incontinent male patient, in many instances they require considerable dexterity and understanding for their application and use, and often require trained personnel for their proper administration to the patient and for their continued management. In order to overcome these disadvantages and deficiencies and to provide a device which does not require experienced or skilled personnel in its administration or application and management, and which is adjustable to each patient, I have devised a polyvinyl sheath which has an extended air-inflatable cuff and which may be connected to a leg bag or the like for an ambulatory patient or to a small caliber plastic drainage tube and receptacle for the bed patient. The distal portion of the device is transparent or translucent to permit periodic inspection of the penis without removal of the applicance. A proximal inflatable cuff is integrally formed with said sheath and extends to approximately the length of six centimeters to permit or provide maximum contact with the shaft of the male member while exerting minimal pressure per square centimeter when inflated. The valve mechanism permits the cuff to be inflated with air to the individual requirement so as to maintain the position of the appliance upon the body without producing constriction. Because of the use of air for inflation, the device is light and can be readily adjusted for both the ambulatory and the bed patient.

Another embodiment of the device in appropriate sizes and modification is intended for use by the incontinent male pediatric or infant patient. The device facilitates the collection of urine specimens, particularly when recording of total accurate output is vital.

Another aspect of the present invention is the incorporation of a novel, lightweight, plastic drainage tube which is corrugated along its length to provide flexibility, maintain patency, and to allow expansion thereof in a longitudinal direction. Thus, there is minimal tension applied upon the sheath when the patient sits or bends.

Another feature of the urine collection system of the present invention is the provision of a nylon canvas leg bag with which the corrugated flexible tube communicates while a novel ball mechanism in the neck of the urine receptacle in said bag prevents reflux of the urine into the drainage tube. A leg bag is provided for supporting the urine receptacle which may be disposable and replaced with a fresh receptacle when necessary.

Still other objects and advantages of the invention will be apparent from the specification.

The features of novelty which are believed to be characteristic of the invention are set forth herein and will best be understood, both as to their fundamental principles and as to their particular embodiments, by reference to the specification and accompanying drawings in which FIG. 1 is a perspective and side view of the urine drainage system for the incontinent male patient showing the self-retaining sheath and inflatable cuff, the flexible drainage tube, and a receptacle, as well as a syringe pump for inflating the cuff, the sheath being shown in position upon the male member of a patient;

FIG. 2 shows a portion of the distal end of the sheath with the flexible tube removed, and a plug stopper for enclosing said sheath;

FIG. 3 is a greatly enlarged front view, partly in section and partly broken away, of the urine collecting sheath and showing in detail the addition of a friction-lining element;

FIG. 4 is a section view taken on line 4—4 of FIG. 3;

FIG. 5 is a fragmentary view of another embodiment of the incontinence sheath showing a different form of construction for the inflatable cuff;

FIG. 6 shows the incontinence system with a leg bag and receptacle connected to the bottom end of the drain tube;

FIG. 7 is a somewhat enlarged view of the harness for the leg bag and receptacle;

FIG. 8 is a greatly enlarged fragmentary detail of the manner in which the upper end of the leg bag is constructed;

FIG. 9 is similar to FIG. 6 with the addition of a body harness for supporting the incontinence device;

FIG. 10 is an enlarged fragmentary side view, partly in section, of the apparatus shown in FIG. 9;

FIG. 11 is an enlarged front view of the apparatus taken on line 11—11 of FIG. 10;

FIG. 12 is a perspective view of a receptacle for a bed patient, said receptacle being connected to the bottom end of the drain tube; and FIG. 13 is an enlarged section view taken on line 13—13 of FIG. 12, some parts being shown in elevation and other parts being broken away.

Referring now to the drawing in detail, and particularly to FIGS. 1-5, there is shown one form of the incontinence device of the present invention comprising a tubular flexible elongated sheath generally designated 21, made of a flexible plastic material such as polyvinyl material or the like, whose walls are transparent or translucent. The lower portion of sheath 21 serves as a reservoir which terminates at its lower end in an integrally formed constricted tubular outlet 23. Outlet 23 accommodates a removable plug 24 which forms a friction fit with the somewhat elastic outlet to effect a liquid-tight seal therewith. Plug 24 has an externally extending integrally formed knurled knob 26 which facilitates the manual insertion and removal of said plug relative to said outlet.

The upper open end of sheath 21 is arrayed at an angle relative to its axis as appears from the side view in FIG. 1. The angle of inclination of the upper rim of sheath 21 may vary as determined by the anatomy of the person to which said sheath is applied. While the upper end of said sheath is applied at the pubic area of the patient, the remainder of the sheath extends generally downwardly as will be most convenient for the patient. It is contemplated that the angle of the upper opening of the sheath relative to its axis will vary between 20°–60° while in many instances it will be found that a 40° angle more or less will be suitable.

Surrounding the upper portion of sheath 21 is a circular band or cuff 27, the upper edge 28 of which coincides with and is sealed to the upper rim of said sheath, the lower edge 29 of said cuff extending equa-distantly away from said upper rim edge and being secured by suitable means to the outer surface of sheath 21 to form an airtight seal therewith.

In the embodiment shown in FIG. 3, cuff 27 consists of a separate sheath of flexible plastic material whose upper and lower edges are bonded by suitable means to the outer surfaces of said sheath to form leak-tight seals therewith.

In another embodiment as shown in FIG. 5, sheath 21 has an integrally formed extension on the upper end thereof which is reverse-folded back upon itself to form a cuff 27a, the lower edge of said cuff being suitably bonded to the outer surface of said sheath to form an airtight seal therewith.

In both embodiments of FIGS. 3 and 4, cuffs 27 and 27a, respectively, and the upper end of sheath 21 form an annular cavity or chamber 30 which may be inflated to cause the upper end of said sheath inside said cuff to be reduced in diameter.

Cuffs 27 and 27a have respective apertures 31 and 31a to which is connected one end of tube 32 by means of an airtight seal, the other end of said tube terminating in a valve 33 to which a pump syringe 34 or the like may be removably attached for inflating cuff chamber 30.

Valve 33 effectively forms a seal when chamber 30 has been inflated to the extent of the pressure desired or necessary to be maintained.

In some embodiments it may be advantageous or desirable to provide an annular liner band 36 cemented or otherwise bonded to the inner wall of sheath 21 at the upper open end thereof. Band 36 may be made of a suitable plastic foam material that serves as a protective layer between the inner surface of the cuff portion of the sheath 21 and the penile skin, or between the inflated cuff ring and the adjacent pubic skin to insure optimum liquid-tight seal. Thus, band 36 permits the inflated cuff to accommodate itself in accordance with individual anatomical differences and idiosyncrasies.

Being located at the upper end of sheath 21, the inflated cuff of the self-retaining device shown in FIGS. 1 to 6 is intended to be placed adjacent the pelvic region at the base of the penis. In this position, less pressure per square centimeter is required on the organ to maintain the appliance in a self-supporting position. The circumferential pressure that can be tolerated safely by the male organ is greater at the base adjacent the pelvis than at any other location on the shaft of the penis. The declining angle of the upper open end of sheath 21 (see FIG. 1) is particularly suitable for application of the device directly to the pubic area and to the base of the penis, where both anatomical structures are accommodated.

As illustrated in FIGS. 1 and 10, the inflatable cuff 27 is also arrayed at substantially the same angle relative to the axis of sheath 21 as the upper rim thereof. When said cuff 27 is inflated to secure said sheath to the male organ, said sheath is maintained in a dependent position whereby the urine flows by gravity to the lower end of said sheath. Were the inflatable cuff disposed perpendicularly to the axis of the sheath, the inflation of such a cuff would elevate the male member and the sheath, and pull the upper rim of the cuff away from the pubis, thereby resulting in loss of a major area of skin contact and permitted pooling of the voided urine in the region of the cuff and leakage back onto the patient. The angled cuff 27 herein, when inflated, remains securely adjacent the pubis and allows the sheath and contained male member to remain in a dependent position thereby ensuring proper disposition of the voided urine and preventing discomfiture of the patient.

Sheath 21 may be utilized to obtain specific quantities of urine specimens which are collected therein with plug 24 located in neck 23. Sheath 21 is preferably transparent or translucent so that its contents may be readily observed through its walls while in place. When a sufficient or desired quantity has been collected, cuff chamber 30 may be deflated by opening valve 33, thereby releasing said sheath from the patient, after which the specimen may be poured into a suitable receptacle.

If continual urine drainage is required for the bed patient, plug 24 is removed and the upper end of a drainage tube 38 is connected to its neck 23, the other end of tube 38 being inserted into a suitable receptacle 39, as shown in FIG. 1.

When the patient is ambulatory, it is desirable to provide a large volume receiver supported on the leg and connected with sheath 21. Accordingly, as shown in FIG. 6, plug 24 is dispensed with and constriction 23 is connected by means of a liquid-tight fit to the upper end of tube 38, the lower end of which is connected with a fluid-tight fit to the upper end of a disposable urine bag 41 made of polyethylene or the like. Bag 41 is removably supported within leg bag 42 which is secured to the leg by means of two pairs of straps 43 and 44. Straps 43 and 44 have adjustable means such as a plurality of snaps 45 or the like which permit the adjustment of said straps to legs of different sizes. Leg bag 42 is provided with an opening which is closeable by means of a slide fastener 46 or the like to facilitate the insertion and removal of urine bag 41. While leg bag 42 and straps 43, 44 may be made of any suitable fabric, nylon or the like is the fabric of choice because of its quick washing and drying properties. Slide fastener 46 may also be made of nylon to avoid rusting and contamination to which other types of fasteners are subject. Slide fastener 46 may be partially opened to observe the contents within transparent or translucent urine bag 41 from time to time as may be necessary.

Located between the lower end of tube 38 and the top of urine bag 41 is a ball valve mechanism 47 within housing 48 made of a suitable material such as Teflon, nylon or the like, which effectively serves as an anti-reflux device to prevent regurgitation from the urine bag 41 upwardly into tube 38.

The upper open end of disposable urine bag 41 is connected to valve housing 48 by stretching the neck of said bag thereover until it reaches beyond an annular peripheral recess 49 in said housing. A resilient slip ring 50 of elastic material or coiled spring is thereafter rolled back over the overlapping neck of bag 41 until it snaps into recess 49 where it secures bag 41 with a liquid- and air-tight seal to said housing. Extending upwardly from housing 48 is a tube 51 to which the lower end of drainage tube 38 is connected.

An important feature of flexible drainage tube 38 is that its walls are transversely corrugated in such a manner that it may bend freely in all directions while the patient is ambulatory without transmitting any tension to any other part of the tube, as would otherwise occur if the latter were not corrugated. By means of such corrugation, the integrity of the seal juncture between said tube and sheath outlet 23 and the juncture with urine bag 41 is maintained so that accidental leakage is effectively prevented. The corrugations on tube 38 may take the form of regular or irregular but substantially uniformly and closely distributed circular constrictions therein, or random crinkle effect corrugations, both forms serving to render the tube flexible in any portion thereof without the transmission of any tension or compression forces to the ends of said tube. The corrugations provide an accordian-like longitudinal expansibility and yieldable contractibility with resistance to obstruction by kinking. Also, the corrugations reduce to a practicable minimum the tension on sheath 21 and ensure freedom of urine outflow therefrom. Greater leg mobility without anxiety for possible untoward accidents is provided for the ambulatory patient by such a corrugated tube which is yieldable throughout its length to bending and twisting actions.

The same transparent or translucent polyvinyl sheath with its integral proximal inflatable ring, in the form of a doughnut, may also be utilized in the case of the particular incontinent male patient where the size of the organ, lack of cooperation on the part of the patient, or some other condition, such as infancy, prohibits use of the skin of the penis to maintain the position of an incontinence sheath. In such cases, the appliance is held in place by a nylon elastic hardness with the anatomically conforming inflatable doughnut shaped ring of the sheath pressing against the pubic and scrotal skin. In this embodiment, no pressure is exerted on the shaft of the penis while the translucency or transparency of the remainder of the sheath allows inspection of the penis and the voided urine therein without removal of the appliance.

This alternative embodiment is shown in FIGS. 9, 10, and 11, wherein a harness 52 made of a suitable fabric such as elastic nylon canvas, extends across the pubic region and has an aperture through which sheath 21 freely extends after the latter, with its cuff inflated, has been placed in position around the male member as described hereinbefore.

The diameter of said harness aperture is substantially equal to the normal diameter of sheath 21 but is less than the outside diameter of cuff 27 when the latter is inflated. Accordingly, harness 52 retains and urges the inflated portion of sheath 21 and cuff 27 against the pubic area of the body, said harness being tied around the hips of the patient by means of pairs of strap extensions 53 and 54, the actual buckles or connecting elements between these straps not being shown since they are any of several well known types.

As is manifest from the illustration of FIG. 10, the appliance conforms readily to the anatomy of the patient by virtue not only of the angular disposition of the upper end of sheath 21, but also because of the resilience of the flexible cuff portion thereof which is inflated and which distributes its pressure readily over irregular and curved surfaces of the body under urging of harness 52. Conformation of the inflated cuff portion of sheath 21 may be enhanced by tightening or suitably adjusting straps 53 and 54 whose respective ends are similar to and may have the same types of fastening means as straps 43 and 44 shown in FIG. 7.

In the embodiment of FIGS. 9, 10 and 11, the appliance may be provided, if desired or necessary, with plastic foam liner band 36 which, when cuff chamber 30 is inflated, causes said band to be urged against the skin of the pubis and around the penis of the patient to form a liquid-tight seal therewith.

A suitable aperture is also provided in harness 52 to permit extension of tube 32 therethrough.

In those situations where the patient is immobilized in bed, the lower end of drainage tube 38 may be connected by way of a valve housing 61 to a disposable urine bag 62, said bag being connected to said valve housing as by means of an elastic slip ring 63. See FIGS. 12 and 13. Urine bag 62 is located within a support bag 64 also has a vertical slide fastener 67 made of said support bag having a wire bail 66 and hook 67 for suspending said bag at or near the bedside of the patient. Support bag 64 has a vertical, elongated window 68 made of transparent or translucent plastic material through which the liquid within the urine bag 62 may be visually inspected, since urine bag 62 is also made of polyethylene or the like, which is transparent or translucent. The support bag 64 also has a vertical slide fastener 67 made of nylon or the like, the opening of said slide fastener providing access to the interior of said bag for insertion and removal of urine bag 62.

The foregoing detailed description has been given for clearness of understanding only and no unnecessary limitations are to be understood therefrom. The invention is not limited to the exact details shown and described, for obvious modifications will occur to those skilled in the art.

What is claimed is:

1. An incontinence device for a male patient comprising a flexible elongated tubular sheath, the upper open end of said sheath being arrayed at an angle relative to the axis thereof, the upper portion of said sheath being adapted to surround the male member, the upper annular edge of the sheath being applied and conforming flexibly to the pubic area around said male member, the remainder of said sheath depending downwardly from the body of the patient, an outlet at the lower end of said sheath, an inflatable annular chamber at the upper end of said sheath, the inflation of said chamber causing said flexible sheath to grasp the base portion of the male member whereby said sheath is suspended therefrom a flexible drainage tube, one end of said drainage tube being detachably connected to said outlet for draining liquid from said sheath, the other end of said tube being connectable to a urine bag, said drainage tube having transverse corrugations rendering said tube expansible and contractable to the extent whereby tension applied to any portion of said tube is not appreciably transmitted to said sheath or to the connection between said tube and said outlet whereby said sheath remains secured to said male member, and a support bag removably mountable on said leg, said urine bag being made of a disposable material and being located within said support bag.

2. A device according to claim 1 and further comprising a slide fastener closure in said support bag, said urine bag being removably inserted through said closure.

3. A device according to claim 1 and further comprising a valve body to which said drainage tube is removably connectable and wherein said urine bag is made of a thin plastic material and has a constricted neck, said neck being removably extensible over said valve body and an elastic resilient slip ring which is movable over said neck to secure said bag to said valve body.

References Cited

UNITED STATES PATENTS

| 2,699,781 | 1/1955 | Koch | 128—295 |
|---|---|---|---|
| 2,883,985 | 4/1959 | Evans | 128—295 |
| 3,116,734 | 1/1964 | Terman | 128—295 |
| 3,353,538 | 11/1967 | Carrigan | 128—295 |
| 3,356,091 | 12/1967 | Patterson | 128—295 |
| 3,364,932 | 1/1968 | Beach | 128—295 |
| 3,349,768 | 10/1967 | Keane | 128—276 |

FOREIGN PATENTS

| 832,186 | 2/1952 | Germany. |
|---|---|---|
| 666,090 | 7/1963 | Canada. |

CHARLES F. ROSENBAUM, Primary Examiner